United States Patent
Raichel

[11] 3,880,567
[45] Apr. 29, 1975

[54] BAGEL FORMING APPARATUS

[75] Inventor: Michael Baruch Raichel, Beersheba, Israel

[73] Assignee: Ashray Samig, Inc., Philadelphia, Pa.

[22] Filed: May 31, 1974

[21] Appl. No.: 475,274

[52] U.S. Cl. ............................................ 425/364 B
[51] Int. Cl. ............................................ A21c 11/00
[58] Field of Search ........................... 425/364 B, 371

[56] References Cited
UNITED STATES PATENTS

| | | |
|---|---|---|
| 2,779,298 | 1/1957 | Chwirut et al. ................. 425/364 B |
| 3,799,726 | 3/1974 | Lugo .............................. 425/364 B |
| R25,536 | 3/1964 | Thompson ....................... 425/364 B |

Primary Examiner—Francis S. Husar
Assistant Examiner—David S. Safran
Attorney, Agent, or Firm—Edelson and Udell

[57] ABSTRACT

Apparatus for forming a lump of bagel dough into an uncooked bagel comprising a trough-shaped sheet of flexible canvas having a surface with dough gripping properties and having spaced apart sidewalls between which a lump of bagel dough is received, a guide cooperable with the sidewalls of the canvas trough for curving the latter toward one another and thereby converting the trough into a cylindrical chamber, and a mandrel provided with a number of dough gripping bands fixedly supported in the chamber along the cylindrical axis thereof defining an annular region within which the lump of bagel dough is rolled, kneaded and formed into a toroidal shape as the canvas cylindrical chamber is moved relatively to the mandrel. The canvas trough is secured to a bottom form carried by the periphery of a wheel, the form having a semi-circular groove within which the canvas is attached so that its sidewalls are free, and preferably the sheet of canvas is radially cut to facilitate its attachment to the bottom form and its conformation to the cam surface of the top guide. The guide includes a top form having a cam surface that is semi-circular in cross-section, with the top and bottom forms being movable relatively to each other so that the free edges of the trough sidewalls engage with and conform to the cam surface of the top guide. An opener device is provided to insure sufficient opening of the flexible bagel forming chamber to release the contained formed bagel, and a spreader device is incorporated to prevent the trough flexible sidewalls from tending to assume an inwardly curved stance after passing out of contact with the opener device due to the repeated closing forces exerted by the top guide.

17 Claims, 8 Drawing Figures

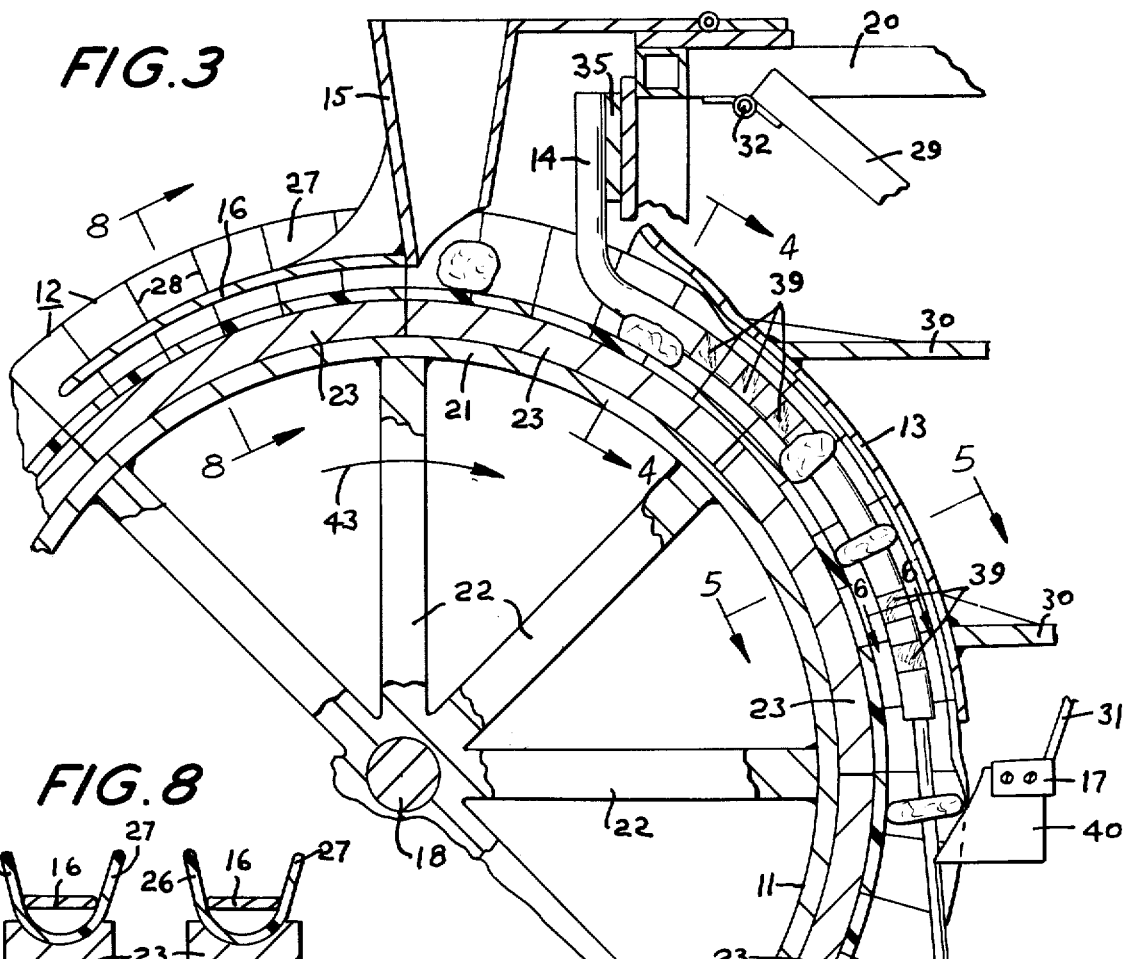
FIG. 3
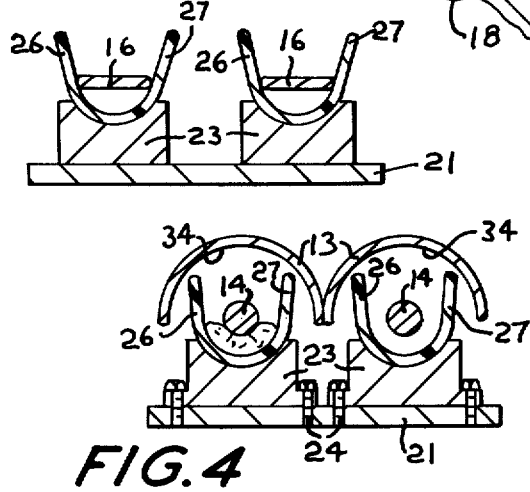
FIG. 4
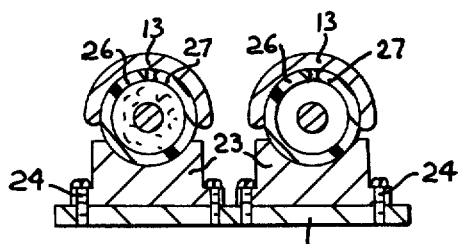
FIG. 5
FIG. 6
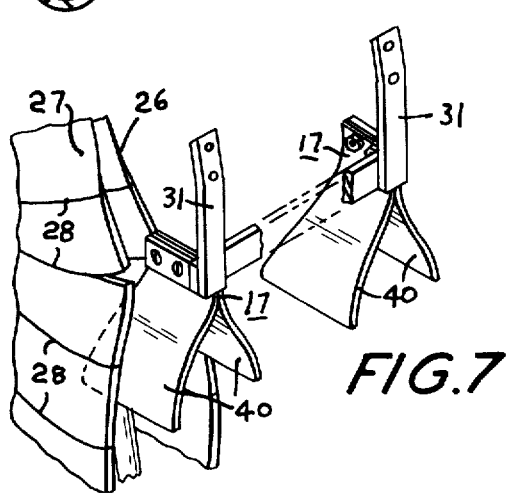
FIG. 7
FIG. 8

BAGEL FORMING APPARATUS

This invention relates to apparatus for foming a lump of bagel dough into an uncooked bagel.

Bagel dough, which is relatively heavy, tough and elastic should not be worked excessively during its conversion from a lump into a toroidal shape if the cooked bagel is to be tender. Conventional apparatus for achieving such conversion usually employs a plurality of rigid metal molds through which a stationary mandrel passes. The mold is opened to permit insertion of a lump of bagel dough, and then closed and moved relative to the mandrel causing the lump of dough to be rolled and kneaded by contact with the mandrel and the interior surface of the closed mold until a toroid is formed. The mold is thereupon opened permitting the toroid to be removed.

It is conventional for the mold to be made in two rigid parts which are either hinged together in order to be closed completely and carried on an endless chain, or separately mounted on two chains that travel along a common path. In either case, the apparatus is bulky and the molds are expensive. Furthermore, the inner surface of the molds are usually smooth with the result that the dough gripping property of the mold is limited, and the conversion process can be carried out successfully only if the molds are run closed over a considerable length. This situation results in an elongated machine which takes up considerable floor space.

According to the present invention, apparatus for forming a lump of bagel dough into an uncooked bagel comprises a trough-shaped sheet of flexible canvas or the like having a surface with dough gripping properties and having spaced apart sidewalls between which a lump of bagel dough can be received, a guide cooperable with the sidewalls of the canvas trough for curving the latter toward one another and thereby converting the trough into a cylindrical chamber, and a mandrel fixedly supported in the chamber along the cylindrical axis thereof for defining an annular region within which the lump of bagel dough is rolled, kneaded and formed into a toroidal shape as the canvas cylindrical chamber is moved relative to the mandrel.

To assist in shaping the trough, the invention includes a bottom form having a semi-circular groove within which the canvas is attached so that its sidewalls are free, and the guide includes a top form having a cam surface that is semi-circular in cross-section, with the top and bottom forms being movable relative to each other so that the free edges of the trough sidewalls can engage with and conform to the cam surface of the top guide. To assist the smooth camming operation of the top guide it may be lined with a low friction material, such as teflon. Preferably, the trough is arranged so that the free edges of the sidewalls are slightly spaced from each other, on the order of about one-half inch, when the sheet is formed by the guide into the cylindrical chamber.

To minimize the overall size and complexity of the apparatus into which the invention is incorporated, the bottom form is made integral with or attached to the periphery of a wheel so that the semi-circular groove runs circumferentially about the wheel, and the sheet of canvas is radially cut to facilitate its attachment to the bottom form and its conformation to the cam surface of the top guide. To further reduce the length over which the dough must be worked in order to convert the lump to a toroidal shape, the sheet of canvas must be coated with a low adherence material, such as teflon, on the inside of the trough to inhibit sticking of the dough to the sheet as the rolling, kneading and forming process occurs, and may be similarly coated on the outside to provide a low friction camming engagement with the top guide.

Additionally, to provide rolling movement and preclude slippage of the bagel dough with respect to the mandrel surface as the dough is carried along the mandrel by the canvas cylindrical chamber, the mandrel is provided with a number of dough gripping canvas bands spaced lengthwise along the mandrel and extending circumferentially thereabout. These canvas bands are preferably also coated with a low adherence material such as teflon.

Despite the use of a low adherence coating material on the inside walls of the canvas trough there is a tendency for the canvas cylindrical chamber not to completely open to its trough form as it emerges from the top guide and to therefore not release the formed bagel. Accordingly, an opener device is provided to insure sufficient opening of the flexible bagel forming chamber to release the contained formed bagel.

It has also been found that after a period of use the trough flexible sidewalls tend to assume an inwardly curved stance after passing out of contact with the opener device due to the repeated closing forces exerted by the top guide. This could, if permitted to progress, cause sufficient top closure of the trough walls to interfere with the deposition into the trough from above a lump of bagel dough, which would of course render the apparatus inoperative. A spreader device is incorporated into the apparatus to prevent such a problem.

Accordingly it is a primary object of the invention to provide a novel bagel forming apparatus of small size which operates to continuously produce uncooked fully formed toroidal bagels from lumps of bagel dough.

Another object of the invention is to provide a novel bagel forming apparatus as aforesaid utilizing flexible wall bagel forming molds in conjunction with forming devices which cause the flexible mold walls to be appropriately opened and closed as required to reliably form and release bagels.

A further object of the invention is to provide a novel bagel forming apparatus as aforesaid wherein the bagel forming flexible molds are spaced contiguously around the periphery of a rotatable circular wheel which repetitively carries the molds successively to, a dough receiving station, a bagel forming device, a bagel releasing station, and a mold conditioning station.

The foregoing and other objects of the invention will appear more clearly hereinafter from a reading of the following specification in conjunction with an examination of the appended drawings, wherein:

FIG. 3 is a vertical sectional view through the apparatus as seen when viewed along the lines 2—2 of FIG. 2;

Figure 1:
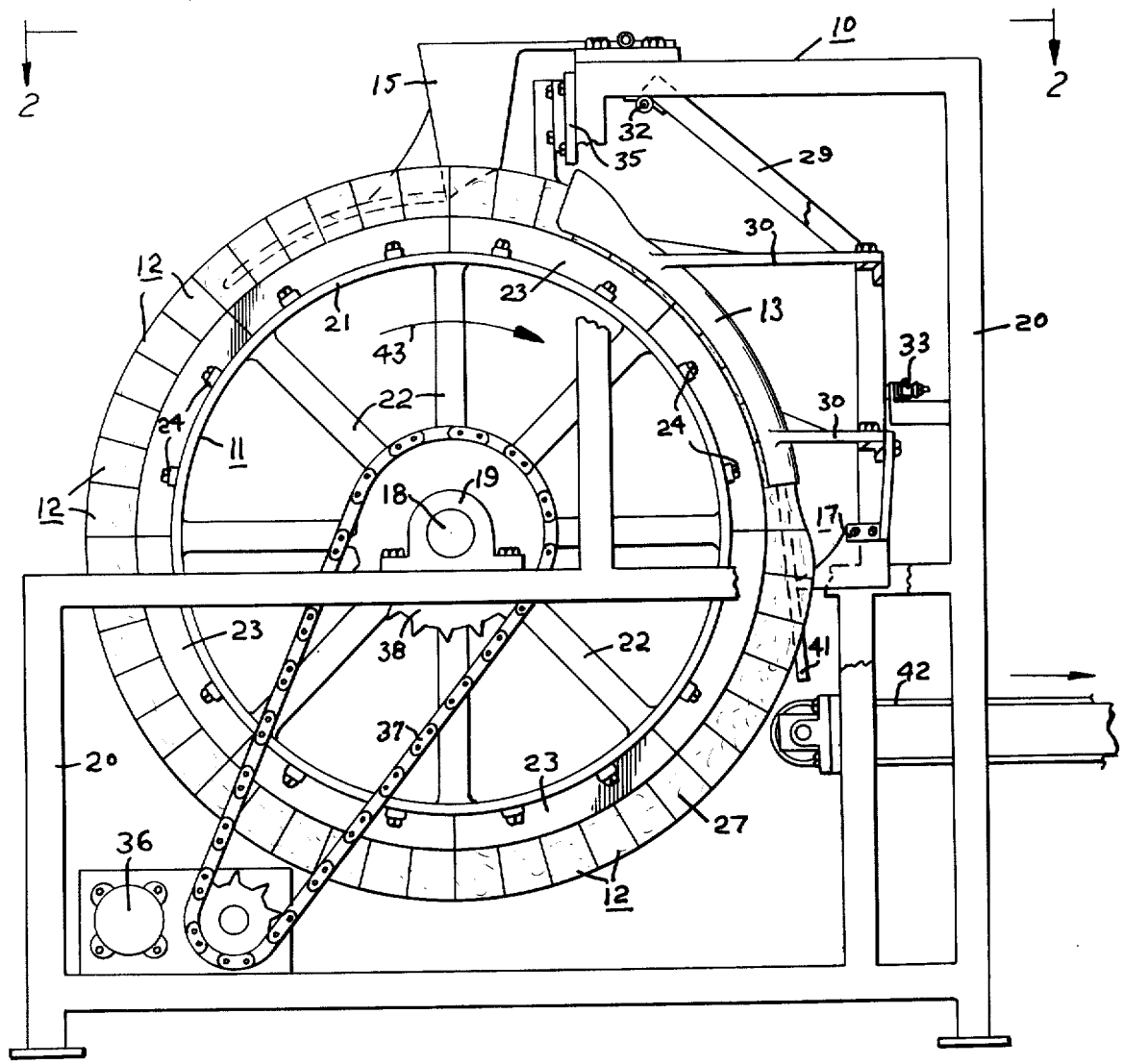
FIG. 1 is a side elevational view of the apparatus according to the invention.

FIGS. 4, 5, 6 and 8 are all cross sectional views through the apparatus as seen when viewed respectively along the lines 4—4, 5—5, 6—6 and 8—8 of FIG. 3; and FIG. 7 is a fragmentary isometric view on an enlarged scale of the flexible wall mold opening device forming part of the invention and as also seen in FIGS. 1 and 3.

In the several figures, like elements are denoted by like reference characters.

Referring now to the drawings, the apparatus according to the invention for forming a lump of bagel dough into an uncooked bagel is designated generally as 10 and comprises wheels 11 to which are attached a plurality of molds 12, camming top forms 13, mandrels 14, hoppers 15 and spreaders 16, and mold openers 17. A shaft 18 mounted in the hub of wheel 11 is rotatably mounted in a pair of bearing blocks 19 attached to the apparatus machine frame 20. The periphery of wheel 11 is defined by a flat rim 21 connected to the wheel hub by means of a plurality of spokes 22.

The molds 12, peripherally mounted on the rim 21 of the wheel 11, each comprise a bottom form constituted by a plurality of curved segments 23 secured to the rim 21 by bolts 24 and extending completely circumferentially around each of the wheels 11, and a trough-shaped flexible sheet 25 of canvas or like material attached to the segments 23. Such material has a surface that has good dough-gripping properties. Each of segments 23 has a semicircular groove, which, when the segments are attached thereto, extends circumferentially completely around the wheel. The central portion of sheet 25 is cemented or otherwise attached within the semi-circular groove of segments 23 so that the side edges 26, 27 of sheet 25 are free as shown in FIGS. 4 and 8. The edges 26 and 27 may be radially cut, as at 28, to facilitate conforming sheet 25 to the curved periphery of the wheel. Alternatively, sheet 25 may itself be segmented in the same manner as the segments 23. Preferably, sheet 25 is provided with a teflon coating that prevents dough from sticking thereto while the dough is being worked. A suitable material for the sheet is teflon coated canvas available from Globe Albany Corporation of Buffalo, N.Y. under the trademark "Junior Graytex".

Figure 2:
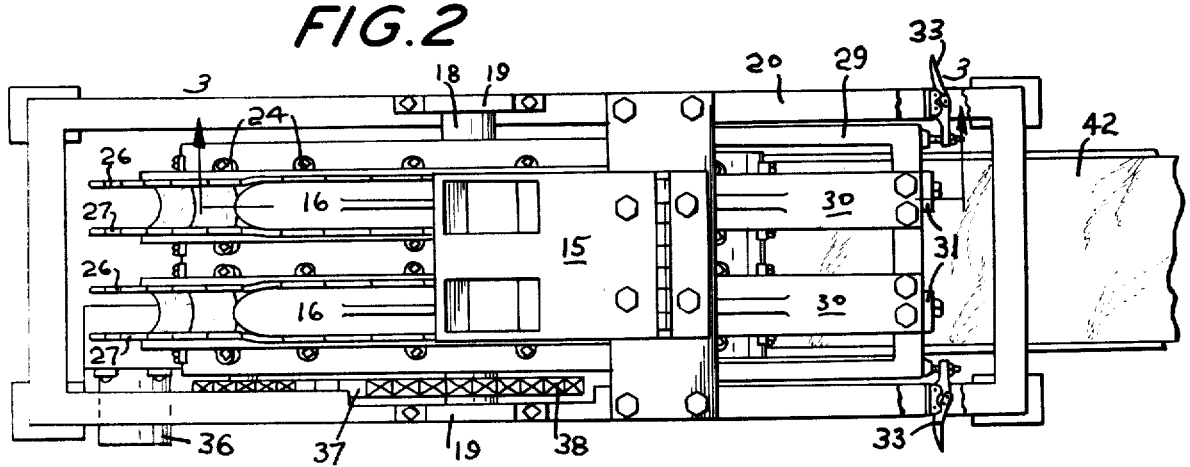
FIG. 2 is a top plan view of the apparatus as seen when viewed along the lines 2—2 of FIG. 1.

The camming top forms 13 and mold openers 17 are respectively rigidly attached to a U-shaped frame 29 of the apparatus as shown in FIGS. 1, 2 and 3 by means of struts 30 and 31. The frame 29 is pivotally mounted to the machine frame 20 as at 32 so that the entire assembly of top forms 13 and mold openers 17 can be swung upward away from the molds 12 for ease of cleaning and access to the mandrels 14. The swingable locks 33 secured to the machine frame 20 hold the swingable U-shaped frame 29 in operative position and are movable to release the frame for upward swinging movement.

The top forms 13 each have a cam surface 34 that is semi-circular in cross-section as shown in FIGS. 4 and 5 and extends through an arc of approximately 60° about the wheels 11 and are operatively disposed closely adjacent thereto. The spacing of the top forms from the wheels is such that the cam surfaces 33 are cooperable with the edges 26 and 27 of sheets 25 for curving the edges toward one another and thereby converting the troughs formed by the sheets into cylindrical chambers as shown in FIG. 5. To aid in this action it is preferred that the cam surfaces 34 be lined with a low friction material such as teflon. The cylindrical chambers have a diameter which defines the outer diameter of the toroidal shape produced by the apparatus. As shown in FIG. 5, the free edges 26 and 27 are somewhat spaced from each other when the cylindrical chambers are established. The precise space is dependent upon the size of bagel being produced, but for regular size bagel, the space typically may be about one-half inch.

The mandrels 14 are essentially circular in cross-section and are curved in an arc as shown in FIGS. 1 and 3 to fit midway between the cam surfaces of the top forms 13 and the semi-circular grooves in the bottom forms as shown in FIGS. 3 and 5. The mandrels 14 are attached by suitable supports 35 to the frame 20 of the apparatus so that both the mandrels 14 and the top forms 13 are held stationary when a power source 36 causes wheels 11 to rotate by means of chain drive 37 and sprocket 38 secured upon wheel shaft 18. Spaced at intervals along the mandrels are friction bands 39 made of the same coated canvas of which the sheets 25 are made and of substantially the same diameter as that of the mandrels, the mandrels being of reduced diameter under the bands to accommodate the thickness of the material of which the bands are made, as shown in FIG. 6. The friction bands 39 catch the bagel dough and by imposing a resistance to forward movement cause the dough to advance by rolling instead of slipping, which forms the flattened lump into the desired toroidal shape and also provides proper surface finishing.

Spaced somewhat below the bottom edge of the top forms 13 are the mold openers 17 each of which consists of a pair of arculately curved plates 40 which enter the gap between the side edges 26 and 27 of the mold sheet 25 and engage the inside surfaces thereof for a distance sufficient to insure that the mold sheet side edges peel away from the formed bagel to release the latter and permit it to fall downward along rod 41 for deposition on conveyor 42 which latter removes the bagel for further processing.

In operation, the power source 36 imparts rotation to the wheels 11 as shown by arrow 43 in FIG. 3, causing successive portions of edges 26 and 27 to operatively engage cam surface 34 of guide 13. Before such engagement, the free edges 26 and 27 are spaced apart as shown in FIGS. 2 and 8 to permit a succession of lumps of bagel dough from hoppers 15 to be deposited in the bottom trough thereof and also to allow the leading portion of mandrel 14 to pass freely between the spaced edges 26 and 27. Continued movement of the wheel draws the lump of bagel dough into the interstial space between mandrel 14 and the flexible sheet 25. The initial engagement of edges 26 and 27 with the leading portion of cam surface 34 begins to curve the free edges toward one another until they assume the positions shown successively in FIGS. 4 and 5. The frictional surfaces of sheet 25 and bands 39 grip the lumps of bagel dough which are rolled and kneaded and formed into the desired toroidal shape upon further rotation of the wheel. In this manner a continuous sequence of bagels is supplied to the conveyor 42.

As the wheels 11 continue to rotate, the side edges 26 and 27 of the molds from which bagels have been released rotate around until they approach the hoppers 15 from the rear where the rounded leading edge of the spreaders 16 pass between the side edges as best seen in FIGS. 2, 3 and 8, and cause them to be moved outward away from one another to thereby prevent any tendency toward inward permanent curvature which could result from the repetitive action of the camming top forms 13.

Having now described my invention in connection with a particular embodiment thereof it will be appreciated that modifications and variations of my invention may now occur from time to time to those normally skilled in the art without departing from the essential spirit or scope thereof, and accordingly it is intended to claim the same broadly as well as specifically as indicated by the appended claims.

What is claimed to be new and useful is:

1. Apparatus for forming a lump of bagel dough into an uncooked bagel, comprising:
    a. an elongated sheet of flexible material having a dough gripping surface, said sheet having a longitudinally extending central region and a pair of side marginal free edges which latter are turned up to form an open trough having a bottom and sidewalls with said dough gripping surface as the inside surface thereof, said trough being longitudinally closed upon itself so as to form an annular trough in which the open trough faces outward away from the center of the annulus and wherein the plane of the annular trough is oriented substantially vertically,
    b. guide means cooperable with the said free edges of the said trough effective to curve them toward one another to thereby convert the portion of said trough engaged with said guide means into a circular cylindrical chamber,
    c. drive means for continuously moving successive longitudinally disposed portions of the entire periphery of said annular trough into and out of engagement with said guide means, and
    d. a mandrel supported in the chamber along the axis thereof and defining with the wall of the cylindrical chamber an annular region within which the lump of dough is rolled, kneaded and formed into a toroidal shape as the cylindrical chamber is moved relatively to the mandrel.

2. Apparatus as defined in claim 1 wherein said trough has a coating that inhibits the sticking of dough thereto.

3. Apparatus as defined in claim 1 wherein the edges of said trough are spaced slightly apart from one another when said trough is converted into a cylindrical chamber.

4. Apparatus as defined in claim 1 further including a bottom form having a groove of semi-circular cross section within which the longitudinally extending bottom region of said trough is conformingly attached so that the trough sidewalls and edges are free, the said guide means including a top form having a cam surface that is semi-circular in cross-section, and the top and bottom forms being relatively movable so that the free edges of the trough engage with the cam surface of the guide means and conform the trough side walls thereto as the latter are turned toward one another.

5. Apparatus as defined in claim 1 further including opener means engageable with the inwardly turned free edges of said trough after the latter disengage from said guide means, said opener means being effective to peel said trough free edges and sidewalls outward away from one another to thereby insure release of the formed toroids therewithin.

6. Apparatus as defined in claim 1 further including spreader means engageable with the side walls of said trough before the latter receive therebetween a lump of dough to be formed into a toroid, said spreader means moving said free edges and sidewalls outward away from one another to thereby prevent any tendency toward inward permanent curvature due to the repetitive action of said guide means.

7. Apparatus as defined in claim 4 wherein said bottom form is carried by the periphery of a wheel so that the said semi-circular groove extends circumferentially completely around said wheel, and wherein at least the said free edges and side walls of said trough are radially cut to facilitate conforming them to the cam surface of the said guide means and conforming the said annular trough to said wheel, said wheel being rotated by said drive means.

8. Apparatus as defined in claim 4 wherein the edges of said trough are spaced slightly apart from one another when said trough is converted into a cylindrical chamber.

9. Apparatus as defined in claim 7 wherein said wheel is rotatable and said guide means and mandrel are fixed.

10. Apparatus as defined in claim 7 wherein the leading end of said guide means cam surface is flared to first engage the free edges of said trough and then gradually move them toward one another as said wheel is rotated.

11. Apparatus as defined in claim 7 further including opener means engageable with the inwardly turned free edges of said trough after the latter disengage from said guide means, said opener means being effective to peel said trough free edges and sidewalls outward away from one another to thereby insure release of the formed toroids therewithin.

12. Apparatus as defined in claim 7 further including spreader means engageable with the side walls of said trough before the latter receive therebetween a lump of dough to be formed into a toroid, said spreader means moving said free edges and sidewalls outward away from one another to thereby prevent any tendency toward inward permanent curvature due to the repetitive action of said guide means.

13. Apparatus as defined in claim 10 further including opener means engageable with the inwardly turned free edges of said trough after the latter disengage from said guide means, said opener means being effective to peel said trough free edges and sidewalls outward away from one another to thereby insure release of the formed toroids therewithin.

14. Apparatus as defined in claim 11 further including spreader means engageable with the side walls of said trough before the latter receive therebetween a lump of dough to be formed into a toroid, said spreader means moving said free edges and sidewalls outward away from one another to thereby prevent any tendency toward inward permanent curvature due to the repetitive action of said guide means.

15. Apparatus as defined in claim 14 wherein said trough has a coating that inhibits the sticking of dough thereto.

16. Apparatus as defined in claim 14 wherein the edges of said trough are spaced slightly apart from one another when said trough is converted into a cylindrical chamber.

17. Apparatus as defined in claim 14 wherein said guide means extends around the periphery of said wheel through an arc of approximately 60° and is positioned in the upper quadrant of said wheel so that the entrance to said guide means is proximate to the top of the wheel and the exit from said guide means is proximate to the horizontal plane through the wheel axis.

* * * * *